United States Patent Office 3,066,128
Patented Nov. 27, 1962

3,066,128
POLYMERIZATION PROCESS
Edward A. Youngman, Lafayette, Calif., assignor to Shell Oil Company, New York N.Y., a corporation of Delaware
No Drawing. Filed Oct. 12, 1959, Ser. No. 845,645
10 Claims. (Cl. 260—94.3)

This invention relates to improved processes for the polymerization of butadiene. More particularly it relates to improvements in the processes for the polymerization of butadiene whereby the resulting product is all, or very nearly all the cis 1,4-addition product.

It is known that butadiene and other ethylenically unsaturated hydrocarbons may be polymerized to produce sterospecific polymers. The processes whereby polymer having a high degree of sterospecificity is obtained are known in the art. Such polymerizations of ethylenically unsaturated compounds are conducted at temperatures below 120° C. and pressures that are less than 500 p.s.i. Normally, the processes are conducted with specified catalysts at temperatures and pressures that are more nearly normal temperatures and pressures. Further, the processes whereby sterospecific polymer is obtained requires that the polymerization be conducted in the absence of various impurities that are harmful to the over-all processes. Such impurities include, for example, moisture, oxygen, oxygen-containing compounds, sulfur, sulfur-containing compounds and the like. The effect of such impurities may be to produce polymer having substantially less stereospecificity or the impurities may react with the catalyst to reduce the polymerization rates or the yield of polymer. Another class of compounds which are considered to be harmful, particularly in diene polymerizations where structural homogeneity has an important effect on polymer properties, are unsaturated hydrocarbons other than the hydrocarbon to be polymerized. Unsaturated hydrocarbons, other than the monomer to be polymerized, will be present in substantial amounts when copolymers are to be produced. When unsaturated hydrocarbons are present in smaller amounts, as in the order of several parts per million, or less, the effect may be to reduce the structural purity of the product. Small reductions in over-all efficiency of the processes can be tolerated in large scale operations but care is usually taken to avoid the presence of large amounts of impurities of any kind. In any case, the better practice is to conduct the polymerizations under conditions whereby impurities of the type just mentioned are removed insofar as possible because of other processing difficulties that may arise. One such difficulty is that the ultimate product may lack uniformity whether continuous operations or batch operations are employed and this lack of uniformity is of vital importance from the marketing aspects of the polymer.

The present invention is directed particularly to the polymerization of butadiene by processes whereby the ultimate product contains a very large proportion of the cis 1,4-addition product. Cis 1,4-polybutadiene is a rubber-like polymer that is highly useful in the manufacture of automobile and truck tires and in many respects it is superior to natural rubber for this purpose. However, in order for the cis 1,4-polybutadiene to be useful for this purpose it must not contain too high a proportion of the other possible addition products such as the 1,2-, of the trans 1,4-addition products. If the polymerization is conducted in the presence of too many impurities of the type described the ultimate polymer may contain too much of the other forms of polymer so that a product is obtained that falls outside the useful rubber range. This, in fact, is generally true so that it has been heretofore believed that it is vital that the sterospecific polymerization of butadiene be conducted in the substantial absence of all kinds of impurities. The present invention is based on the finding that sterospecific cis 1,4-polybutadiene may be produced in the presence of certain unsaturated hydrocarbons wtihout adversely effecting the polymerization or the nature of the product, and, in fact, may be conducted to afford a very substantial processing advantage.

It is an object of this invention to provide improvements in processes for producing cis 1,4-polybutadiene. Another object of this invention is to provide improvement of the processes for the polymerization of butadiene whereby the butadiene is admixed with unsaturated hydrocarbons. It is yet another object of this invention to provide such processes whereby a substantial reduction in over-all operating costs will always be experienced. Other objects will become apparent as the description of this invention proceeds.

These and other objects are accomplished by the process for polymerizing butadiene in the presence of a catalyst comprising the reaction product of (1) a heavy metal halide selected from the group consisting of nickel halide, cobalt halide and mixtures thereof with (2) an activator for the heavy halide selected from the group consisting of a strong reducing agent, a Friedel-Crafts compound and mixtures thereof, the said butadiene be admixed with at least one monobutene. By this process the butadiene is selectively polymerized and the butenes remain unchanged so that they are easily separated from the cis 1,4-polybutadiene product. This feature will be recognized to be a substantial departure from the prior art teachings.

One principal advantage afforded by the present invention is that raw butadiene may be polymerized with the unique and selective catalysts of the present invention to obtain a polymer having a high cis 1,4-content without subjecting the raw butadiene to costly separation procedures. This may be best illustrated by describing what is involved in the production of butadiene. Briefly, butadiene may be produced by dehydrogenating n-butane, butenes or mixtures thereof. In fact such processes are used commercially and the prior art on the production of butadiene by the dehydrogenation of $C_4$ hydrocarbons is quite voluminous. Representative prior art in this field is illustrated, for example, by U.S. Patents 2,804,487, 2,814,943 and 2,831,042. From the prior art on the preparation of butadiene from $C_4$ hydrocarbons it will be observed that the amount of butadiene that is present in the reaction product is rather low, that is, in the order of about 30% by weight. Sometimes this amount can be increased by the adoption of careful production methods or by various improvements in the dehydrogenation processes but in general 30% is a representative figure although in actual practice it may be considerably less than that. This means that there remains in the reaction product from the dehydrogenation processes something in the order of about 70%, or more, of other $C_4$ hydrocarbons which heretofore were separated almost entirely before the butadiene was considered sufficiently pure for the production of cis 1,4-polybutadiene. The separation of the $C_4$ hydrocarbons, whether they be butenes or unreacted butane, is time consuming and requires capital expenditures of several million dollars. An idea of the complexity of such apparatus may be had from U.S. Patent 2,816,943.

The present invention is based on the surprising finding that butenes will not copolymerize with butadiene when the polymerization is conducted in the presence of the catalyst systems mentioned above and at the same time the butadiene is polymerized to a high content of the cis 1,4-addition product. This is a surprising finding since it is reported that a mixture of butadiene and butene-1 will result in a copolymer when the polymerization is conducted in the presence of other sterospecific catalysts. Thus, one would normally expect that a copolymer of butadiene and the butenes, particularly butene-1, would be obtained but this has been found not to be the case. While the present invention is not intended to be limited by any theoretical consideration, two possible explanations are offered for whatever value they may be to persons persuing research in this art. First, it may be that when using the catalysts required by this process the reactivity ratios of butenes and of the butadiene differ so greatly that butenes copolymerize too infrequently to have a detectable effect on polymer properties. Second, it is entirely possible that the catalysts required for the polymerization according to this invention are highly selective for butadiene and are essentially inert to mono-butenes.

The butadiene that is subjected to the polymerization may then be, in essence, a crude butadiene mixture obtained from the dehydrogenation of $C_4$ hydrocarbons. The crude material is actually a mixture of butadiene, butane, butene-1 and butene-2. The last three components would normally be present in a large amount, usually in excess of 50%, by weight, of the total. The actual percentage of each of the $C_4$ components will vary a great deal depending on the dehydrogenation processes but the significant feature of the present invention is that it is immaterial how much mono-butenes are contained in the mixture as they will not polymerize or copolymerize in the presence of the instant catalysts but rather only the butadiene will polymerize. The $C_4$ hydrocarbons obtained from the dehydrogenation usually accounts for 100% of the crude mixture but it is possible, depending on the processes used for the dehydrogenation, that small, or trace amounts of foreign substances may find their way into the crude mixture. One such impurity may be, for example, moisture. If it is not present in too great a quantity, then it will not adversely effect the present inventive processes. If it is desired to remove the water, then the mixture may simply be passed through a tower containing a conventional dessicant. Other impurities that may be present include sulfur-containing compounds that may, for example, originate with sulfur-containing dehydrogenation catalysts. Such impurities may be easily removed by passing the crude hydrocarbon mixture through molecular sieves. Other impurities may similarly be removed, e.g., by a simple and selective extraction by suitable purification trains. Still another type of foreign material that may be contained in the crude mixture of $C_4$ hydrocarbons are monoolefins other than those having four carbon atoms as ethylene, pentenes, octene-1 and the like. Such olefins may originate because of the high temperatures used during the dehydrogenation of $C_4$ hdyrocarbons whereby some degradation of dimerization may take place. A surprising feature of the present invention is that the butadiene will not copolymerize with such monoolefins and, of equal significance is the finding that such monoolefins will not adversely effect the specificity for cis 1,4-enchainment or adversely effect the rate of polymerization.

Although the treatment of the dehydrogenated $C_4$ stream to remove any undesirable material presents no operational problems, it will be readily appreciated that an advantage is obtained if the $C_4$-fraction, which is used in the present invention, is prepared under conditions that minimizes or eliminates the formation of undesirable materials in the crude hydrocarbon. Thus, it would be the better practice to conduct the dehydrogenation with a sulfur-free dehydrogenation catalyst. Similarly, it would be better to supply the heat required for the dehydrogenation externally rather than injecting superheated steam into the mixed $C_4$ hydrocarbon mixture. In any case, the present inventive polymerizations do not depend upon any particular method for producing the butadiene as long as it is admixed with monoolefins and as it happens $C_4$-monoolefins would be present in large amounts usually in excess of about 50% by weight.

Although one of the major advantages of the present invention is that it permits the utilization of a crude butadiene feed, it will be readily apparent that the invention need not be limited to such a feed stream. Indeed, if desired one may prepare a feed stream that contains the butadiene in admixture with butenes and other unsaturates such as pentenes or the like. Such a procedure would be employed by one who does not have crude butadiene available. In such cases it is useful to carry out the polymerizations of this invention in the presence of more butenes than are contained in crude butadiene streams and in this regard the amounts of butenes which are beneficially employed range in the order of 30-80% by weight of the total reaction mixture. Such amounts of butenes afford several important advantages one of which is that better cooling is obtained and this will be considered in more detail later. Another advantage obtained with larger amounts of the butenes is that it permits more efficient reaction and mixing of the monomer and polymer during the course of the polymerization because it reduces very substantially the viscosity of the liquid within the reactor. Still another advantage is that the use of larger amounts of butenes permits better control of the molecular weight, as represented by the intrinsic viscosity, of the elastomer although the reasons for this are not fully understood.

The amount of the butadiene which is added, as a mixture, to the reactor using the alternative procedure may range from 5 to 40% by weight of the total reaction mixture depending on whether continuous or batch procedures are employed and upon the desired molecular weight. It is preferred, however, that the butadiene be present in amounts ranging from about 10 to about 30% and this preference is based on considerations of efficient operations due to reasonable conversions, viscosity of the contents of the reactor and other considerations concerning the recovery of the polymer.

One advantage of this invention is that the use of butenes as the major portion of the solvent permits the use of evaporative cooling of the polymerization. Thus the pressure of the system can be regulated to allow the butenes to boil (evaporate), cooling the contents of the reactor. The evaporated butenes are condenser in a suitable condenser leading from the vapor space of the reactor and the condensed butenes are fed back into the polymerization system. This procedure offers a high degree of temperature control which cannot be attained by cooling surfaces in the reactor and permits faster reactions particularly in viscous solution polymerizations.

The catalyst employed for the polymerizations of this invention are those prepared by activating a halide selected from the group consisting of cobalt halide, nickel halide or mixtures thereof. In essence the heavy metal halide is the critical component and if different metal halides are used copolymers will be obtained as indicated in the prior art. The nickel halide or cobalt halide preferably is selected from the chlorides and bromides with the others being less prefered. The activating agent, however, may be selected from a large variety of materials particularly strong reducing agents and Friedel-Crafts catalysts. Such activating agents have been referred to in the art as "initiators" or "catalyst initiators." Among the more suitable reducing agents there may be mentioned organo-aluminum compounds wherein the organic radicals are alkyl radicals having up to 10 carbon atoms each. More preferred are organo-aluminum compounds as aluminum alkyl halides such as aluminum diethyl chloride, aluminum dipropyl chloride, the corresponding bromides or the like. Particularly attractive forms of organo-aluminum compounds are the aluminum alkyl sesquihalides such as aluminum ethyl sesquichloride. In general, the preferred reducing agents are represented by the formula AlRR$_1$R$_2$ wherein R is alkyl and R$_1$ and R$_2$ are selected from alkyl, hydrogen or halogen. Other suitable reducing agents include metal hydrides such as sodium hydride, lithium hydride, aluminum alkyl hydrides and the like. Yet another group of reducing agents include other metal alkyls as zinc diethyl, magnesium diethyl and similar reducing agents. Although reducing agents, as a class, will be found to be operable for the present invention they are not all equally suitable because they will affect the rates of polymerization. Further some of the less preferred reducing agents may reduce the cis 1,4-content slightly. It is to be noted, however, that a reduction in rates of polymerization is not necessarily a disadvantage as it may be desirable in some instances to permit the polymerization to proceed slowly. Friedel-Crafts' catalysts are well known and include, for example, aluminum chloride, aluminum bromide and the like.

The catalysts employed for the present processes are essentially reaction products of the heavy metal halide and an activating agent of the type described wherein the mole ratio of the heavy metal halide to the activator is less than 1 in the final active product. The preparation of the catalyst is simple and merely requires that the catalyst components be brought togethter in a hydrocarbon diluent preferably in benzene although such hydrocarbons as toluene and the like may be used. Aliphatics as pentane, hexane, isopentane and the like may also be used but it is better that they be mixed with benzene. The reason for the preference of aromatic hydrocarbon solvent is that the elastomer is more readily soluble in benzene and if benzene is present then the elastomer is less likely to precipitate during the course of the polymerization. With this consideration in mind it will be seen that other inert hydrocarbon solvents may be employed which will help maintain the elastomer in solution during the course of the polymerization. Another class of organic solvents is the cycloalkanes such as cyclohexane, cyclopentane, cyclononane, and the like. Alternatively, the reaction conditions may be so selected that other hydrocarbon solvents, particularly the aliphatics, will keep the elastomer in solution but that alternative is less preferred since the temperatures needed will be substantially less desirable.

On the other hand, it is decidedly disadvantageous to employ an inert hydrocarbon solvent which is essentially all aromatic as benzene, or cycloalkane, as cyclohexane because their higher boiling points are a disadvantage during subsequent recovery operations. Accordingly, one of the more preferred procedures employs an aromatic hydrocarbon solvent or a cycloalkane in an amount just sufficient to maintain the elastomer in solution during the course of the polymerization. With this consideration in mind it has been found that about at least 5% by weight of the reaction mixture should be an aromatic hydrocarbon solvent as benzene or a cycloalkane. With lesser amounts the solubility of the elastomer is not assured unless temperatures are adjusted. Preferably the amount ranges in the order of 15 to 20% by weight of total reaction mixture and while larger amounts may be employed this is not desirable for reasons indicated above.

There are several variations for the catalyst preparation some of which provide substantial advantages. In one variation the catalyst is prepared by mixing an excess of the cobalt and/or nickel halide in an inert diluent with an organo-aluminum compound and aging until active. If desired the composition, including the hydrocarbon diluent, may be used as the catalyst for the present invention. The catalysts prepared by such procedures contain a substantial amount of solid as a fine suspension in the hydrocarbon diluent and these solid components will ultimately be found in the resulting polymer. Accordingly, the polymer may have to be treated in order to separate or reduce the amount of the catalyst contained therein as the catalyst components are found to be harmful to the stability and physical properties of the cis 1,4-polybutadiene. Apart from the possible disadvantage of requiring treatment of the polymer such a catalyst is perfectly suitable for carrying out the polymerizations of the present invention. An alternative and much preferred procedure is to separate the solid residue and utilize the liquid fraction as the catalyst component. This procedure has the advantage that the catalyst is in a soluble form and is more easily separated from the polymer by a simple washing. Another advantage of the soluble catalyst is that substantially lesser amounts are required and very little residues remain in the polymer.

The aging for the preparation of the soluble catalyst may be accomplished by any desired means but actually two fundamental procedures are available. The first procedure comprises allowing the mixture of the solid in the hydrocarbon diluent to stand for a period of time equivalent to the desired aging period. The second procedure comprises heating the mixture for a period of time and thereby inducing aging. Both procedures will produce substantially the same results but the latter has the advantage that the aging period is substantially shorter. The liquid catalyst aged by heating employs temperatures ranging from about 30° C. to about 150° C. If desired, higher temperatures may be employed but no substantial advantages are obtained thereby. The heating period may last from about 30 minutes to about 20 hours or more depending on the temperature. The mixture thus prepared may be employed as the catalyst but it is preferred that the mixture be treated to separate the solid from the liquid fraction. This may be accomplished by filtering, centrifuging or decanting. The aged catalyst which is produced on standing merely requires that the mixture of the solid low pressure catalyst and the hydrocarbon diluent be permitted to stand at room temperature for 12 hours to several weeks, or longer. Stirring or agitating will reduce the time required for aging. The liquid fraction thereof is very conveniently separated by merely decanting because the solid fraction will, in most cases, settle to the bottom of the vessel. If desired, it may be more convenient to filter the contents of the reactor in order to separate the soluble phase. In all cases it will be found that the activity of the catalyst will increase with aging until a maximum activity is attained. With further aging, the activity will gradually fall off. Thus, a catalyst which has aged at room temperature on standing for 10 weeks will have greater activity than a catalyst which has aged on standing at room temperature for 12 hours although 24 to 96 hours is adequate in most instances. It is an another advantage of the present invention that the solid residue remaining from the recovery of the liquid catalyst may be reused by merely adding additional hydrocarbon diluent thereto. This is of considerable importance because it decreases the catalyst cost. In one preferred variation the catalyst is prepared by mixing the heavy metal halide in a hydrocarbon diluent, as benzene, with aluminum ethyl sesquichloride. After stirring the mixture at room temperature and allowing the cobalt and/or nickel halide to settle out, it will be found that the solution contains all of the added aluminum compound and a small amount of the cobalt or nickel salt and the solution is an active polymerization catalyst. For example 4.8 grams of CoCl$_2$, 323 g. of benzene and 2.6 cc. of aluminum ethyl sesquichloride are stirred in an inert atmosphere at 25° C. for three days. The excess cobalt salt is allowed to settle and the liquid portion of the catalyst is found to contain 21 mg. cobalt per liter and is highly active for the cis,1,4-polymerization of butadiene according to this invention.

In yet another variation, cobalt or nickel halide in benzene is brought into solution by heating with aluminum chloride. For example, 0.82 g. CoCl$_2$ and 2.47 g. AlCl$_3$ are dissolved in 250 cc. benzene by refluxing for 24 hours. The solution prepared so as to exclude oxygen, sulfur or oxygen and sulfur-containing compounds is satisfactory for the purposes of the present invention. Aluminum chloride and other Friedel-Crafts compounds seem to increase the solubility of the cobalt and/or nickel halide and represents a convenient way of bringing the heavy metal halide into a form suitable for reaction with the previously mentioned aluminum alkyl, aluminum alkyl halides, and other strong reducing agents. Other Friedel-Crafts compounds perform a similar function as do organic phosphines, phosphites, and phosphates. Such solubilizing agents are preferably employed in amounts in the order of 1 to 3 moles per mole of cobalt and/or nickel. Larger amounts may be used but little, if any, advantage is offered thereby.

The quantity of the compounds employed in the preparation of the liquid catalyst will depend somewhat on the heavy metal halide and activator but may be varied as desired. In actual practice it is best to elect a particular ratio for a particular metal halide and activator and maintain that ratio for all polymerizations. In that way greater uniformity in product and processes are achieved. In the preferred embodiment the molar ratio of the metal halide to the organo-metallic compound in the liquid catalyst solution ranges from about 1:1 to that wherein the ratio is about 1:10. At higher ratios, that is in the order of 1:20, or even higher, no commensurate gain is obtained as best results are obtained within the preferred range. The quantity of active catalyst contained in the hydrocarbon diluent will vary depending on the nature of the components employed, the diluent, the aging conditions and the like. In view of these considerations the quantity of catalyst required to effect polymerization will vary and catalytic amounts will be used. In most cases, the soluble catalyst contains small amounts of the metal from the organo-metallic component and the metal from the metal salt. The former may range from 1 to 15 gms./liter and the latter may range from about .10 to 2 gms./liter. It will be appreciated that these amounts indicate those which are effective in the more preferred embodiments of the invention although greater or lesser amounts may be present depending on the inherent variables and the particular conditions of polymerization adopted.

The monomer to be polymerized, as indicated above, may be the crude feed obtained from the preparation of butadiene. Such feeds may contain as little as 10% by weight of butadiene while the remainder comprises other $C_4$ hydrocarbons as butene-1, cis- and trans-butene-2, and the like. The amounts of the various $C_4$ components will vary widely depending on the processes used to manufacture the butadiene from other $C_4$ fractions but for the purpose of this invention it is immaterial how much butadiene or other $C_4$ hydrocarbons are contained in the mixed feed. Such feeds having boiling points that are below normal temperatures and in order to carry out the polymerization most conveniently the feed is maintained as a liquid during the polymerization. This may be done by lowering the temperature or by the use of higher temperatures and elevated pressures. Either procedure is suitable as long as the feed is in the liquid phase.

The temperature required to maintain the feed as a liquid will vary greatly depending on the composition of the feed and if the feed is to be maintained in the liquid phase by the use of lowered temperatures only, temperatures in the order of about $-10$ to $10°$ C. would be required at about atmospheric pressure. Lower temperatures may be used but in any case the use of such low temperatures is inconvenient and more costly. When such temperatures are used the more preferred catalysts are employed in order to provide a feasible rate of polymerization. Such a catalyst is represented by, for example, the reaction product of cobalt chloride or nickel chloride and aluminum chloride.

Because of the inconveniences and higher costs of operating at the low temperatures it is preferred to carry out the polymerization at higher temperatures and elevated pressures. This is suitably accomplished by conducting the polymerization in a pressure vessel at about room temperatures with the pressure being sufficient to maintain the $C_4$ hydrocarbons in the liquid phase. Here it will be appreciated that there is an interdependence of temperature, pressure and composition of the $C_4$ hydrocarbon feed so that a variation of any of these factors will affect the others which in turn will affect the temperatures and pressure required to maintain a liquid phase. As an illustration, a representative crude feed from the dehydrogenation of butadiene can usually be maintained as a liquid at about 20° C. and 35 p.s.i. At 30° C. the pressure should be about 50 p.s.i. At higher temperatures still higher pressures will be required and in general temperatures in excess of about 100° C. should not be used.

The polymerization is initiated by bringing together the polymerization catalyst and the crude butadiene feed whereupon the reaction will begin. As the polymerization progresses, the polymer that is formed will remain in solution in the liquid medium and it will become increasingly viscous as the butadiene is converted into polymer. Because of the increase in viscosity agitation in batch operations and transfer of the solution in continuous operation becomes more difficult. Accordingly, the better practice is to continue the polymerization until the polybutadiene represents about 5 to 50% by weight of the mixture, with about 10 to 30% by weight, being more preferred, before terminating the polymerization.

After the polymerization is complete the polymer may be recovered by any of several procedures. One such procedure comprises mixing the polymer solution with a polar coagulating agent as isopropanol, ethanol, acetone, or the like. The coagulating agent may be added at room temperature or below whereupon the liquified $C_4$ hydrocarbons will vaporize. If desired gentle heat may be applied to hasten the removal of the $C_4$ hydrocarbons but not sufficient heat to vaporize the polar coagulating agent. The vaporized $C_4$ hydrocarbons are recovered and then recycled to the unit manufacturing butadiene with or without interim pretreatment as may be required. The coagulated polymer is recovered from the slurry of the polar coagulating agent by centrifuging, decanting or filtering.

Another procedure for recovering the polymer is by subjecting the solution of the polymer in the liquified $C_4$ hydrocarbon mixture to spray drying. Such a procedure is particularly suitable for continuous operations and has the advantage that heat requirements are at a minimum. When such a procedure is used the recovered polymer should be washed soon after recovery with a polar solvent in order to destroy the remaining active catalyst contained in the polymer. In such procedures the vaporized $C_4$ hydrocarbons are also easily recovered but will normally require a pretreatment before being recycled to the dehydrogenation unit in order to separate air, moisture or other impurities that may have become mixed with the vapors.

The present inventive processes are capable of numerous modifications. One modification is to carry out the polymerizations in the liquid phase by dissolving the feed in a hydrocarbon diluent as benzene or other normally liquid hydrocarbons and subjecting the solution thus prepared to polymerization with the catalysts of the type described above. This procedure has certain advantages particularly in regard to ease of material handling. However, if such a modification is used the liquid diluent as benzene, must ultimately be separated from the unreacted butadiene, $C_4$ butenes, and butane before they are recycled to the unit where the butadiene is prepared. This recovery of the recycle fraction is not complex but care should be taken to prevent contamination of the diluent before it is reused.

Still other modifications may be made, particularly in regard to the polymerization temperatures and pressures but such modifications will be readily understood to be merely methods of permitting the polymerization to proceed in the liquid phase. In a similar manner, modifications of catalyst choice, particularly in regard to the selection of the activating agent may be undertaken as desired.

The invention is described in greater detail in the examples which follow:

*Example I*

For this experiment the catalyst is prepared by mixing 14.7 gms. of $CoCl_2$, 14.0 ccs. of triisobutyl aluminum and a total of 150 ccs. of benzene. A portion of the mixture is heated at 70–80° C. for twelve hours and the other portion is set aside in a capped vessel. A liquid mixture to be polymerized is prepared by adding 10 ccs. of liquified butadiene and 11 ccs. of liquified butene-1 to 100 ccs. of benzene under conditions that exclude the atmosphere. To this mixture is added 5 ccs. of the liquid fraction from the heated portion of the catalyst preparation. Polymerization is begun, with gentle agitation, at about 15° C. and autogenic pressure and continued for 60 minutes. After the 60 minute reaction time, a vent on the reactor is opened and the temperature is permitted to rise slowly whereupon the unreacted butene-1 and butadiene will be observed to vaporize and escape from the vessel. After about 10 minutes it is estimated that all the butadiene and butene-1 has escaped and then 10 ccs. of isopropanol are added, with agitation, to the solution of polybutadiene in the benzene. This has the effect of inactivating the catalyst and also to coagulate the polymer. An analysis of the polymer by infra-red spectrum will indicate that it consists entirely of polybutadiene with about 96% thereof being the cis 1,4-addition product.

*Example II*

The procedure of Example I is repeated except that in in this case the catalyst is a 5 cc. portion of the supernatant liquid obtained from the catalyst portion set aside in Example I after 34 days of standing. The liquid is found to contain 24.9 gms. of chlorine per liter, 9.6 gms. of aluminum per liter and .35 gm. of cobalt per liter. The polymer that is obtained contains about 99% of cis 1,4-polybutadiene having an intrinsic viscosity of 5.4 after about 10 minutes of polymerization. There is no polymer of butene-1 observed in the final product.

The two preliminary experiments indicate that butene-1 will not copolymerize with butadiene under the conditions described and it will be found that butene-1 and other butenes will not copolymerize with the cobalt or nickel catalysts, of the type previously described, under a greater variety of conditions. This is shown by the following representative experiments.

*Example III*

For this experiment a catalyst is prepared by mixing 1 gm. of cobalt chloride and 3 gms. of aluminum chloride in 20 cc. of benzene. The mixture is refluxed for 12 hours after which the supernatant liquid is recovered. The aluminum chloride acts to solubilize a part of the cobalt in the benzene and probably forms a soluble complex therewith. The supernatant liquid, which contains about 1400 p.p.m. of cobalt, is diluted with benzene to a cobalt content of 565 p.p.m. Thereafter .7 ml. of the diluted soluble catalyst is mixed with 1.8 cc. of 7% aluminum ethyl sesquichloride in benzene and this mixture is added to a mixture of 11 ccs. of butene-1, 20 ccs. of butadiene and 10 ccs. of benzene. The polymerization is conducted in a closed reactor in an inert atmosphere at autogenic pressure and at 15° C. After 100 minutes there is added 10 ccs. of isopropanol and the temperature is raised to 25° C. while venting the vaporizing butene-1 and butadiene. Thereafter the coagulated polymer is recovered and on infra-red analysis it is found to be free of butene-1 and contains 98.6% cis 1,4-polybutadiene and 0.7% each of the trans 1,4- and 1,2-addition products and has an intrinsic viscosity of 3.08.

*Example IV*

The procedure of Example III is repeated except that the soluble catalyst is not diluted but is used in an amount of .7 cc. In this case the polymerization proceeded very rapidly and was terminated after about 15 minutes. The polybutadiene had about the same product distribution, an intrinsic viscosity of 2.5 and was free of butene-1 polymer.

*Example V*

Substantially the same results are obtained when the procedure of Example I is repeated except that the cobalt chloride is replaced with an equivalent amount of nickel chloride. It is noted that the polymerization appears to proceed more rapidly.

By following the procedures described above it is found that similar results are obtained with other reducing agents of the type described above. In general, it appears that greater efficiency is experienced with aluminum alkyl halide than with aluminum trialkyls or other organometallic compounds.

*Example VI*

In this polymerization, a pressure vessel is charged with a liquified mixture of 18 parts by weight of butadiene, 48 parts by weight of butane, 12 parts by weight of butene-1 and 12 parts by weight of mixed cis and trans butene-2. The mixture is maintained as a liquid by the application of 40 lbs. pressure at 15° C. A catalyst composition similar to that described in Example III is added in an amount sufficient to give about 6 parts of cobalt per million parts of reaction mixture. The polymerization is continued for 30 minutes after which the polymer is recovered as described in Example III. It is found to be free of butene polymer and has about 98.6% of the cis 1,4-addition product and an I.V. of 3.2.

*Example VII*

The procedures of Example VI are repeated using a liquid catalyst prepared from cobalt chloride and triisobutyl aluminum. In this case the polymerization has about the same rate but the cis 1,4-content is in the order of 95%.

*Example VIII*

Substantially the same polymer as in Example III is obtained with a liquid catalyst prepared from aluminum ethyl sesquibromide and equimolar amounts of mixed cobalt chloride and nickel chloride but the reaction rate is somewhat greater.

*Example IX*

A soluble catalyst is prepared by aging a mixture of 1 gm. of nickel bromide and 0.75 gm. of triisobutyl aluminum in a total of 100 ccs. of benzene. The aging is accomplished by standing at room temperature for 72 hours. The butadiene polymer utimately produced by the procedure of Example VI has a cis 1,4-content of about 97% and an I.V. of 2.85, determined in toluene at 25° C. In this case the rate is slightly lower and the polymer is all polybutadiene.

*Example X*

The above procedure is repeated except that the liquid catalyst is prepared from 2 gms. of $NiCl_2$ and 1 gm. of triisobutyl aluminum. Rates are better and the cis 1,4-content of the polymer is 96.1%. In a companion experiment, substantial improvements in the rate are obtained by intermittently adding several drops of the liquid catalyst during the polymerization.

*Example XI*

A catalyst is prepared from lithium aluminum hydride and cobalt chloride in a mole ratio of 2:1 in 200 ccs. of benzene by aging at 40° C. for 60 minutes. Following the procedure of Example I, the polymerization is terminated after 90 minutes. The polymer contains about 90% of the cis 1,4-addition product and is free of butene polymer.

*Example XII*

The procedure of Example III is repeated except that the supernatant liquid is not mixed with another activator. Further it is diluted with benzene to contain about 800 p.p.m. of cobalt. The polymerization proceeds rapidly and is terminated in about 25 minutes. The polybutadiene contains about 96% of the cis 1,4-addition product and is free of butene-1 polymer.

From the foregoing description of the invention, it will be appreciated that the processes of this invention are capable of various modifications as will be understood by persons skilled in the art.

This application is a continuation-in-part of Ser. No. 778,571, filed December 8, 1958, now abandoned.

I claim as my invention:

1. The process comprising selectively homopolymerizing butadiene from a mixture of at least 5% by weight butadiene, at least 30% by weight unbranched butenes and at least 5% by weight of a cyclic hydrocarbon, sufficient to maintain the polybutadiene in solution, with a catalyst that comprises the reaction product of (1) a heavy metal halide selected from the group consisting of cobaltous halide, nickelous halide and mixtures thereof and (2) an activating agent selected from the group consisting of metal hydrides, metal alkyls, aluminum halides, and mixtures thereof, the polymerization being conducted in liquid phase at temperatures less than 100° C., whereby rubbery polybutadiene of desired molecular weight, having a high cis-1,4 content, is produced.

2. The process comprising selectively homopolymerizing butadiene from a mixture of at least 5% by weight butadiene, at least 30% by weight unbranched butenes, and at least 5% by weight of benzene, sufficient to maintain the polybutadiene in solution, with a catalyst that comprises the reaction product of cobaltous chloride, aluminum chloride and an aluminum alkyl chloride, the polymerization being conducted in liquid phase at temperatures less than 100° C., whereby rubbery polybutadiene of desired molecular weight, having high cis-1,4 content, is produced.

3. The process comprising selectively homopolymerizing butadiene from a mixture of at least 5% by weight butadiene, at least 30% by weight unbranched butenes and at least 5% by weight of a cyclic hydrocarbon, sufficient to maintain the polybutadiene in solution, with a catalyst that comprises the reaction product of a solubilized heavy metal halide selected from the group consisting of cobaltous halide, nickelous halide and mixtures thereof and an activating agent selected from the group consisting of metal hydride and metal alkyls whereby rubbery polybutadiene of desired molecular weight, having a high cis-1,4 content, is produced.

4. The process of claim 3 in which the heavy metal halide is cobaltous chloride.

5. The process of claim 3 in which the heavy metal halide is solubilized by reaction with aluminum chloride.

6. The process of claim 3 in which the activating agent is an alkyl aluminum compound.

7. The process of claim 3 in which the activating agent is aluminum ethyl sesquichloride.

8. The process of claim 3 in which the activating agent is aluminum diethyl chloride.

9. The process of claim 3 in which the concentration of butadiene in the reaction mixture is from 5–40% by weight.

10. The process of claim 3 in which said butenes are present in the reaction mixture in the concentration of from 30–80% by weight.

References Cited in the file of this patent

UNITED STATES PATENTS

| | | |
|---|---|---|
| 2,953,554 | Miller et al. | Sept. 20, 1960 |
| 2,953,556 | Wolfe et al. | Sept. 20, 1960 |

FOREIGN PATENTS

| | | |
|---|---|---|
| 534,792 | Belgium | Jan. 31, 1955 |
| 543,292 | Belgium | June 2, 1956 |
| 546,150 | Belgium | Mar. 16, 1956 |
| 520,873 | Canada | Jan. 17, 1956 |